April 19, 1966    C. E. TAYLOR ETAL    3,246,366
APPARATUS FOR EXTRUDING
Original Filed Dec. 21, 1961
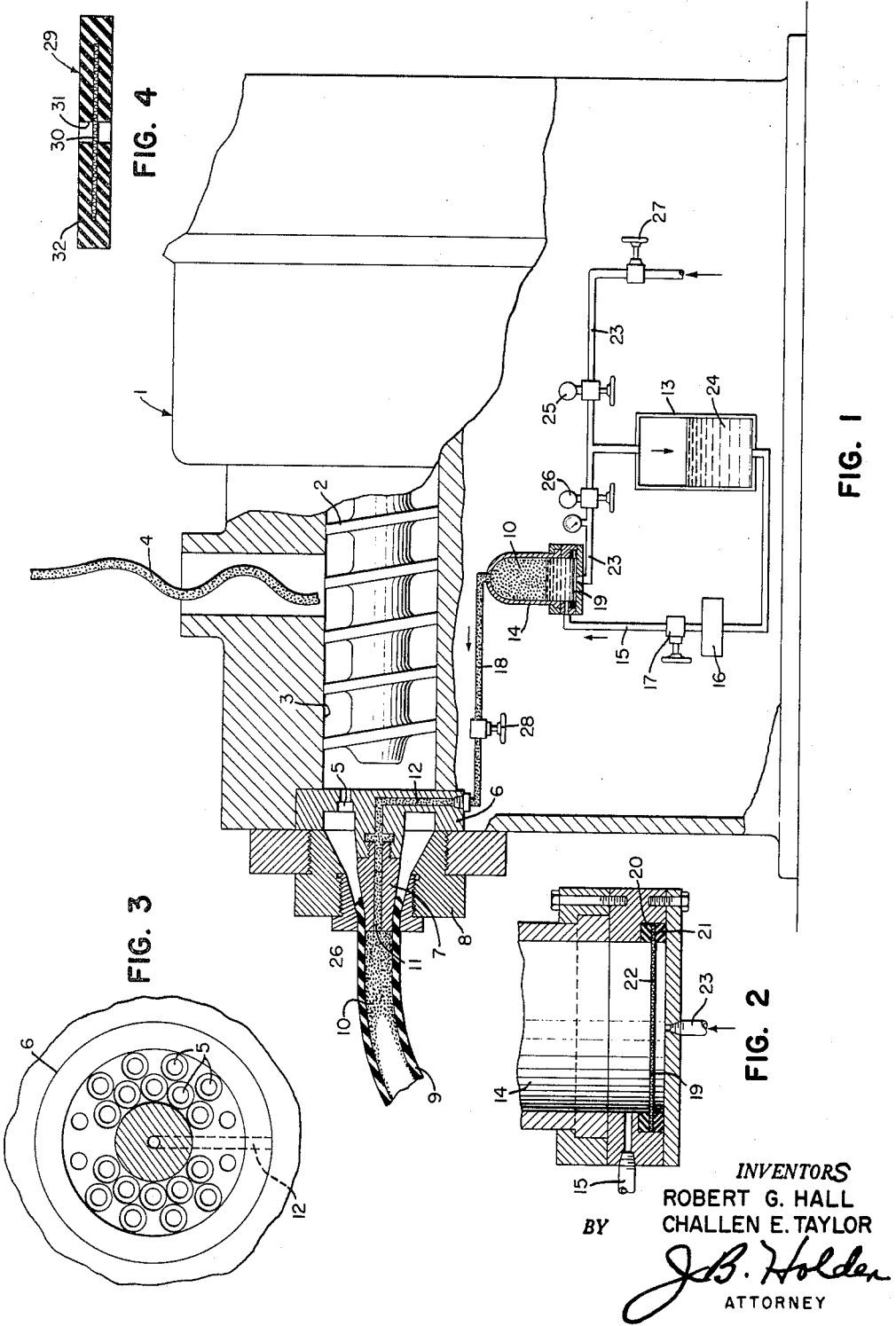
INVENTORS
ROBERT G. HALL
CHALLEN E. TAYLOR
BY
*J. B. Holden*
ATTORNEY

3,246,366
APPARATUS FOR EXTRUDING
Challen E. Taylor, Waukegan, and Robert George Hall, Libertyville, Ill., assignors to The Goodyear Tire & Rubber Company, Akron, Ohio, a corporation of Ohio
Original application Dec. 21, 1961, Ser. No. 160,981, now Patent No. 3,183,288, dated May 11, 1965. Divided and this application Nov. 17, 1964, Ser. No. 416,179
3 Claims. (Cl. 18—14)

This is a division of application Serial No. 160,981, filed December 21, 1961, now Patent No. 3,183,288, dated May 11, 1965.

This invention relates to an apparatus used in conjunction with extruders and more particularly to an apparatus for lubricating the interior surface of an extrusion as it leaves the extruder.

In the process of extruding from rubber or plastic continuous lengths of tubular or closed cross section such as hose, inner tubes, sealing gaskets, etc., it is usually necessary to insert a lubricant of some type into the interior of the extrusion to coat the surface so as to prevent sticking together when collapsed. Soapstone, mica dust, zinc stearate and other dry dust lubricants have been used extensively for this purpose as well as various liquid lubricants on occasion, but it is apparent that the dust and contamination from such lubricants creates a very substantial problem both in the cleanliness and appearance of the extrusion and complications in the additional processing required on some extrusions. In many instances it is necessary to provide additional means to gather the excess dust or liquid lubricants as it is not possible to use the minimum amount and be assured of thorough lubrication.

It has been found that a liquid lubricant such as soap which has been aerated to produce a foam of the lubricant, provides not only an excellent lubricant but also eliminates substantially all contamination and cleanliness problems. The foam also provides a very uniform lubricating film over the entire surface since it clings well and on disintegration, leaves no surplus of lubricating material. This eliminates the need for additional equipment to collect the excess or loose material and as a result reduces waste and eliminates the usual untidiness of the surrounding work area. The apparatus to aerate the lubricant is simple in construction and may be attached to the extruder in place of the present apparatus used for the other type of lubricants without any substantial modification. It is, therefore, an object of this invention to provide a new and novel apparatus to provide the lubricant for the interior of a hollow extrusion as it is extruded.

Another object of the invention is to provide an apparatus for such lubrication that eliminates much of the usual contamination and dust encountered.

A further object of the invention is to provide a simple and inexpensive apparatus to create the lubricant.

A still further object of the invention is an apparatus for providing a more uniform and positive lubrication of the interior of an extrusion.

Another object of the invention is to provide an apparatus that makes it possible to use a minimum of lubricant for a thorough lubrication and eliminate the necessity of collecting or disposing of the excess.

These and other objects and advantages of this invention will become apparent hereinafter as the description thereof proceeds, the novel features, arrangements and combinations being clearly pointed out in the specification as well as the claims thereunto appended.

In the drawings:

FIG. 1 is a schematic and partial sectional plan view illustrating the invention;

FIG. 2 is a detailed sectional view showing a portion of the invention;

FIG. 3 is an end view of a portion of the apparatus; and

FIG. 4 is a modification of a portion of the apparatus.

For the purposes of illustration, in FIG. 1 a typical screw extruder 1 is illustrated in which the extruder screw 2 lies in barrel 3. The rubber or plastic material is fed in the form of a ribbon 4 into barrel 3 and is forced by the screw 2 through the openings 5 in the spider 6 at the end of the barrel 3. Projecting outwardly and centrally from spider 6 is a mandrel 7 which along with the extruder die 8 forms the extruded tube 9 as the material is extruded from the machine. As shown, the spider 6 and portion thereof containing openings 5 is an integral structure but as in many extruders, the spider and breaker plate (portion having openings) are separate parts assembled in the desired relation. The mandrel and die set-up is of conventional construction used in conjunction with extruders for the manufacture of tubing or other extruded hollow extrusions and the set-up illustrated is only shown as an example.

In order to lubricate the interior surface of the tube 9 a foam 10 of an aerated liquid material is continuously passed into the interior of the extruded tube 9 as it leaves the extrusion die 8. The foam 10 enters the interior of tube 9 by means of passageway 11 in mandrel 7 generally extending axially from the outlet end into the spider 6 to connect with passageway 12 therein which extends out of the spider radially between the openings 5 to the exterior periphery thereof. The openings 5 in spider 6, as best seen in FIG. 3, provide the means for the rubber in the extruder barrel 3 to pass into the extruder die and mandrel assembly. In many presently used extruders, the passageway 12 is included in spider 6 for use in inserting the usual lubricants into the interior of an extruded tube.

In order to provide the aerated lubricant, an apparatus such as seen in FIG. 1 may be used. A reservoir 13 holding a supply of liquid lubricating material such as soap is mounted adjacent the extruder. A foam generator 14 is connected to the reservoir 13 by means of tubing 15 which as shown includes a filter 16 to remove any foreign particles in the liquid lubricant as it passes from the reservoir 13 to the generator 14. A valve 17 preferably is also included in the tubing 15 to more accurately control the amount of liquid lubricant flowing between the reservoir 13 and the generator 14. It has been found that by heating the liquid lubricant in reservoir 13 in any desired manner that the foam generation is improved but in many instances this is not necessary.

The generator 14, as shown, is a closed container with a connecting tube 18 joining the top of the container to the end of passageway 12 in spider 6. Adjacent the bottom of the generator 14 is a foam generator screen 19. In the form shown in FIG. 2 the foam generating screen 19 is made up of rings 20 and 21 of resilient material such as rubber around the opposite sides of the periphery of a foraminous element 22. As shown, foraminous element 22 covers substantially the cross sectional area of generator 14 and is spaced from the bottom thereof so that air pressure as will be explained later, can enter the liquid material over the entire area of the generator. Foraminous element 22 is of a material such as heavy twill cloth although fine screen or other types of foraminous material may be used. The screen 19 is clamped snugly in the foam generator 14 and tubing 15 is connected to the side of the foam generator 14 so that the liquid material enters the foam generator 14 immediately above the foam generating screen 19. It has been found that satisfactory foam generation occurs when the liquid soap level in the generator is approximately one-third of the volume of generator 14.

In order to assure uniform flow of the lubricant to the generator, air pressure is applied in the reservoir to the surface of the liquid through pressure line 23 from a source of compressed air (not shown) to maintain the liquid lubricant 24 under a predetermined constant pressure. Regulator 25 is used to control the amount of pressure on the liquid lubricant 24 in reservoir 13.

To generate or convert the liquid lubricant into foam, air pressure is introduced in the bottom of generator 14 below generating screen 19 and passes through foraminous element 22 into the liquid lubricant above the foam generating screen 19. As the air under pressure passes into the liquid lubricant through the foraminous element 22, it is divided thereby into many small streams thus converting the liquid into a foam made up of a multitude of fine bubbles. Regulator 26 controls the amount of air pressure introduced into the foam generator 14.

As shown, the same pressurized line 23 furnishes the compressed air to both the reservoir 13 and the foam generator 14. It has been found that a pressure of approximately 8 p.s.i. on the liquid lubricant in the reservoir and 4 p.s.i. into the foam generator produces a continuous foam flowing at the proper rate into the extruded tube 9. It is apparent that separate air pressure lines or pressurized gaseous materials other than air may be used to accomplish the desired results. As shown, shut-off valves 27 and 28 may be included in lines 23 and 18 respectively to shut off the flow through the lines when desired such as machine shut down or during a die changeover.

Another form of foam generating screen 29 is illustrated in FIG. 4. A foraminous element 30 extends across opening 31 centrally positioned in a pad 32 which would lie on the bottom of generator 14. The edges of foraminous element 30 are embedded in pad 32 and are spaced from the bottom surface 33 thereof.

As the foam is generated in generator 14 it passes out of the generator into tubing 18, thence to the spider 6 and through the passageway 12 in the spider and passageway 11 in the mandrel into the interior of the extruded tube 9. The interior of the tube 9 is completely filled with the foam 10 and in a short period of time the foam deteriorates to leave the film of lubricant upon the interior surface of tube 9. By the proper regulation of the pressure on the reservoir 13 and generator 14 and the rate of flow of the foam 10 into the extruded tube 9, the extent of foaming may be accurately controlled so as to provide only an amount of foam necessary to properly lubricate the interior of the tube 9 and eliminate a surplus of liquid that does not adhere to the tube surface. By providing the lubricant in the form of a foam the interior surface is completely lubricated with a minimum amount of material due to the adherence to the surface by the film formed as the foam deteriorates.

While certain representative embodiments and details have been shown for the purpose of illustrating the invention, it will be apparent to those skilled in the art that various changes and modifications may be made therein without departing from the spirit or scope of the invention.

Having thus fully described our invention, what we claim and desire to secure by Letters Patent of the United States is:

1. In an extruder apparatus wherein the hollow extrusion passes from the extrusion die in a continuous length, the combination with said apparatus of a device to lubricate continuously the interior surface of said extrusion, said device comprising a closed container in which liquid lubricating material is aerated, a foraminous element adjacent the bottom of said container, means to feed the liquid lubricating material into said container above said foraminous element, means to continuously pass a pressurized gas through said foraminous element into said lubricating material to continuously aerate said lubricating material to form a foam thereof, and means connecting said container through the interior of said extrusion die to the interior of the extrusion whereby the foam passes continuously from the container into the extrusion.

2. Apparatus as claimed in claim 1 which includes means to correlate the feed and aeration of the lubricating material with the speed of the extrusion from the die.

3. In an extruder apparatus wherein a hollow extrusion passes from the extrusion die in a continuous length, the combination with said apparatus of a device to lubricate continuously the interior surface of said extrusion, said device comprising a reservoir of liquid lubricating material, a closed container in which said lubricating material is aerated to form a foam, means connecting said reservoir and closed container through which the lubricating material passes from the reservoir to said container, means to apply pressure to said lubricating material in said reservoir to cause the lubricating material to continuously flow at a uniform rate from said reservoir to said container, a foraminous element in said closed container adjacent the bottom thereof, means to continuously pass a pressurized gas through said foraminous element into said lubricating material to continuously aerate the lubricating material, thus forming a foam of a multitude of minute bubbles, means connecting said closed container and the extrusion die through which the foamed lubricating material flows into the interior of the extrusion and means to coordinate the rate of flow of the foamed lubricating material with that of the extrusion.

References Cited by the Examiner
UNITED STATES PATENTS

| | | | |
|---|---|---|---|
| 1,192,645 | 7/1916 | Koerting | 239—590 |
| 1,995,215 | 3/1935 | Mehlsen et al. | 239—343 |
| 2,119,906 | 6/1938 | Dorman | 239—343 |
| 2,519,375 | 8/1950 | Jargstorff et al. | 18—14 |
| 2,632,205 | 3/1953 | Fitz Harris | 18—14 X |
| 2,690,592 | 10/1954 | Schanz | 18—14 |
| 3,103,409 | 9/1963 | Bohres et al. | 18—14 X |
| 3,135,630 | 6/1964 | Bielinski et al. | 239—343 X |

J. SPENCER OVERHOLSER, *Primary Examiner.*

WILLIAM J. STEPHENSON, *Examiner.*